United States Patent [19]

Nakamura et al.

[11] Patent Number: 5,024,974
[45] Date of Patent: Jun. 18, 1991

[54] GLASS HAVING ULTRAFINE PARTICLES OF CUCL AND/OR CUBR PRECIPITATED THEREIN AND PROCESS FOR ITS PRODUCTION

[75] Inventors: Arao Nakamura, Nagoya; Tsuneo Manabe, Yokohama; Naoki Sugimoto, Yokohama; Hiroshi Usui, Yokohama, all of Japan

[73] Assignee: Asahi Glass Company, Ltd., Tokyo, Japan

[21] Appl. No.: 497,535

[22] Filed: Mar. 22, 1990

[30] Foreign Application Priority Data

Mar. 30, 1989 [JP]  Japan .................................. 1-76765
Sep. 19, 1989 [JP]  Japan .................................. 1-240581

[51] Int. Cl.$^5$ .................... C03C 3/11; C03C 3/089; C03C 3/091; C03C 3/064
[52] U.S. Cl. .................................. 501/57; 501/3; 501/32; 501/65; 501/66; 501/77; 501/900
[58] Field of Search ................... 501/3, 57, 32, 65, 66, 501/77, 900

[56] References Cited

FOREIGN PATENT DOCUMENTS 2107343 10/1971 Fed. Rep. of Germany ........ 501/56
46-3464  1/1971 Japan .
1089067  4/1984 U.S.S.R. .............................. 501/905

*Primary Examiner*—Mark L. Bell
*Attorney, Agent, or Firm*—Oblon, Spivak, McClelland, Maier & Neustadt

[57] ABSTRACT

Glass having ultrafine particles of CuCl and/or CuBr precipitated therein, which consists essentially of:
from 10 to 70 mol % of $SiO_2$,
from 30 to 90 mol % of $B_2O_3$,
from 0.1 to 50 mol % of $Li_2O+Na_2O+K_2O$, and
from 0.01 to 10 mol % of CuCl+CuBr.

The glass may further contain from 0.01 to 40 mol % of $Al_2O_3$.

2 Claims, No Drawings

GLASS HAVING ULTRAFINE PARTICLES OF CUCL AND/OR CUBR PRECIPITATED THEREIN AND PROCESS FOR ITS PRODUCTION

BACKGROUND OF THE INVENTION

1. Field of the Invention

The present invention relates to glass having ultrafine particles of CuCl and/or CuBr precipitated therein and a process for its production.

2. Discussion of Background

Recently, it has been found that glass having ultrafine particles of semiconductor such as CdS or CdSe precipitated therein, which used to be employed as a yellow to red sharp cut colored glass filter, has high nonlinear optical properties. Accordingly, an attention has been drawn to such glass as a prospective nonlinear optical material for e.g. ultra-high speed optical switches or memories utilizing the generation of harmonic lights, the generation of phase conjugated lights or the light bistability. It is believed that such high nonlinear optical properties of the ultrafine particle-precipitated glass are attributable to quantum-confining effects such that excitons in the ultrafine semiconductor particles are three dimensionally confined by the deep potential created by the glass.

As such glass having ultrafine semiconductor particles precipitated therein, the above mentioned glass having ultrafine particles of CdS-CdSe system precipitated therein, is known.

On the other hand, it has recently been theoretically predicted that very high nonlinear optical effects can be obtained by forming CuCl into very fine particles. Further, glass having CuCl precipitated therein, has been reported before in USSR, but no details such as the composition of the glass have been disclosed.

The glass having ultrafine particles of CdS-CdSe system precipitated therein shows high nonlinear optical effects which have not been observed in conventional nonlinear optical materials. However, its properties are still inadequate for its use as the above mentioned nonlinear optical material for e.g. a ultra-high speed optical switch or a memory, and it has a problem that it is inoperable unless a laser beam source having a very high output is employed.

On the other hand, Japanese Examined Patent Publication No. 3464/1971 discloses ultraviolet ray-absorbing glass comprising from 40 to 70% by weight of $SiO_2$, from 10 to 26% by weight of $B_2O_3$, and from 4 to 26% by weight of $Al_2O_3$ and from 3 to 25% by weight of $R_2O$ and having CuCl or CuBr particles precipitated therein. However, such glass has a problem that it is thereby difficult to precipitate ultrafine particles of CuCl or CuBr.

SUMMARY OF THE INVENTION

It is an object of the present invention to solve the above mentioned problems inherent to the conventional techniques and to provide glass having ultrafine particles precipitated therein, which is expected to be operated by a compact light source such as a semiconductor laser.

The present invention provides glass having ultrafine particles of CuCl and/or CuBr precipitated therein, which consists essentially of:
from 10 to 70 mol % of $SiO_2$,
from 30 to 90 mol % of $B_2O_3$,
from 0.1 to 50 mol % of $Li_2O+Na_2O+K_2O$, and
from 0.01 to 10 mol % of $CuCl+CuBr$.

The present invention also provides glass having ultrafine particles of CuCl and/or CuBr precipitated therein, which consists essentially of:
from 10 to 70 mol % of $SiO_2$,
from 30 to 90 mol % of $B_2O_3$,
from 0.01 to 40 mol % of $Al_2O_3$,
from 0.1 to 50 mol % of $Li_2O+Na_2O+K_2O$, and
from 0.01 to 10 mol % of $CuCl+CuBr$.

Further, the present invention provides processes for the production of the above glasses.

DETAILED DESCRIPTION OF THE PREFERRED EMBODIMENTS

Preferring to the first glass of the present invention, if $SiO_2$ is less than 10 mol %, it is hardly possible to attain the precipitation of the ultrafine particles of CuCl and/or CuBr. On the other hand, if it exceeds 70 mol %, the vitrification temperature tends to be high, whereby Cu, Cl and Br components tend to be evaporated, such being undesirable.

If $B_2O_3$ is outside the range of from 30 to 90 mol %, it tends to be difficult to attain the precipitation of ultrafine particles of CuCl and/or CuBr.

$Li_2O$, $Na_2O$ and $K_2O$ may be used in a single component or in combination as a mixture of two or three. However, if the total amount is outside the range of from 0.1 to 50 mol %, it becomes difficult to attain the precipitation of ultrafine particles of CuCl and/or CuBr.

Among these ranges, preferred is glass consisting essentially of from 20 to 60 mol % of $SiO_2$, from 35 to 70 mol % of $B_2O_3$ and from 0.5 to 20 mol % of $Li_2O+Na_2O+K_2O$, since it is thereby possible to readily attain the precipitation of ultrafine particles of CuCl and/or CuBr with their particle sizes uniformly controlled.

Further, it has been found that ultrafine particles of CuCl and/or CuBr can be precipitated when copper, chlorine and bromine are contained in such amounts that correspond to $CuCl+CuBr=0.01-10$ mol %. If the copper, chlorine and bromine are less than 0.01 mol % as calculated as $CuCl+CuBr$, fine particles of CuCl and/or CuBr will not precipitate. On the other hand, if the copper, chlorine and bromine exceed 10 mol % as calculated as $CuCl+CuBr$, it tends to be difficult to control the size of precipitated particles.

The second glass of the present invention comprises $SiO_2$, $B_2O_3$, $Li_2O+Na_2O+K_2O$ and $CuCl+CuBr$ within the same ranges as in the case of the first glass and further contains from 0.01 to 40 mol % of $Al_2O_3$. If $Al_2O_3$ is less than 0.01 mol %, the weather resistance of the glass tends to be low, and such glass will not be suitable for use where good weather resistance is required. On the other hand, if $Al_2O_3$ exceeds 40 mol %, the vitrification tends to be difficult, such being undesirable. Within the above range, the content of $Al_2O_3$ is more preferably within a range of from 0.1 to 30 mol %.

It is preferred to add SnO, $SnO_2$, $Sb_2O_3$ and $Sb_3O_5$ in a total amount of at most 5% to the above components, so that ultrafine particles of CuCl and/or CuBr tend to more readily precipitate.

As starting materials useful for the production of the glass having ultrafine particles of CuCl and/or CuBr precipitated therein according to the present invention, the following substances may, for example, be used.

As silicon materials, not only an oxide of silicon such as silicon dioxide, but also nitride, an organic silicon compound or a silicate such as an alkali metal silicate, may be used in admixture with other alkali metal compounds.

As the boron material, not only an oxide such as boric acid ($H_3BO_3$) or boric anhydride ($B_2O_3$) but also a nitride, an organic boron compound or a borate such as alkali metal borate, may be used in admixture with other alkali metal compounds.

As the alkali metal material, a carbonate is a representative example. However, other alkali metal compounds such as hydroxides or chlorides may be used as the case requires.

As materials for copper, chlorine and bromine, not only copper halides such as CuCl, $CuCl_2$, CuBr and $CuBr_2$, but also copper single substance or an oxide, a hydroxide, an inorganic salt such as a sulfate or an inorganic salt of copper, may be employed. Further, with respect to chlorine and bromine, they may be supplied in the form of an alkali metal chloride, an alkali metal bromide, ammonium chloride, ammonium bromide or a chloride or bromide of other additive components. Further, chlorine and bromine may be introduced by reacting them with glass in the form of a gas such as a single substance or a chloride or bromide.

As the aluminum material, not only a hydroxide or an oxide such as aluminum hydroxide or alumina, but also a nitride or an organic aluminum compound, may be used.

There is no particular restriction as to the method for producing the glass of the present invention wherein ultrafine particles of CuCl and/or CuBr are precipitated. For example, predetermined amounts of various starting materials are mixed, and the mixture is heated and melted at a temperature of from 1,200° to 1,600° C. for from 5 minutes to 10 hours, followed by molding the melt into a predetermined shape. Since a volatile materials such as chlorides are used as the starting materials for glass, it is preferred that glass is preliminarily formed by a part of the constituting components, and the starting materials for the rest of the constituting components are added thereto, followed by vitrification again. Further, it is also possible to employ a method wherein glass is produced from a gas phase by e.g. CVD (chemical vapor deposition), or a method wherein glass is produced from a liquid phase by e.g. a sol-gel method.

As a method for precipitating ultrafine particles of CuCl and/or CuBr according to the present invention, there may be mentioned a method in which shaped glass is once cooled to room temperature and then heated and maintained at a predetermined temperature to let ultrafine particles precipitate, or a method in which shaped glass is cooled to the predetermined temperature and held at that temperature to let the ultrafine particles precipitate. The former method is preferred for the purpose of the present invention, since the size of the precipitating ultrafine particles can thereby easily be controlled. The temperature for precipitating the ultrafine particles is within a range of from 400° to 800° C. If the temperature is lower than 400° C., the intended ultrafine particles tend to hardly precipitate. On the other hand, if the temperature exceeds 800° C., the glass tends to be softened, or the glass is likely to undergo devitrification, such being undesirable.

When the shaped glass is maintained at a temperature of from 400° to 800° C. for from 5 minutes to 100 hours, ultrafine particles of CuCl and/or CuBr having a particle size of from 5 to 1,000 Å will precipitate. There is no particular restriction as to the manner of heating. For example, it may be heated by a resistance heating type electric furnace, by a burner or by an electron magnetic wave such as a micro wave or light.

The ultrafine particles of CuCl and/or CuBr precipitated by such treatment preferably have a particle size of from 5 to 1,000 Å. If the particle size is less than 5 Å, excitons tend to be hardly formed in the ultrafine particles of CuCl and/or CuBr. On the other hand, if the particle size exceeds 1,000 Å, the expected effects for confining the excitons in the ultrafine particles tend to be weak, such being undesirable. Within this range, a particle size of from 10 to 500 Å is particularly preferred, since the light absorption of excitons such as ultrafine particles of CuCl thereby tends to shift to a high energy side, whereby remarkable effects for confining the excitons can be expected.

The amount of precipitated ultrafine particles of CuCl and/or CuBr is preferably from 0.01 to 10% by volume. If the precipitated amount is less than 0.01% by volume, no adequate non-linear optical effects attributable to the ultrafine particles of CuCl and/or CuBr will be obtained. On the other hand, if it exceeds 10% by volume, it becomes difficult to precipitate the particles under control of the particle size within the above mentioned range.

Now, the present invention will be described in further detail with reference to Examples. However, it should be understood that the present invention is by no means restricted to such specific Examples.

EXAMPLE 1

A total of 400 g of the starting materials were weighed to obtain the glass composition as identified in Table 1, and the mixture was thoroughly mixed. This mixture was put in a platinum crucible and melted at 1,400° C. for 2 hours, and then cast on a stainless steel plate to obtain glass. In this manner, 16 types of glass having different compositions were prepared.

Such glass was maintained at 460° C. for 4 hours to precipitate ultrafine particles. The glass having the ultrafine particles precipitated therein was polished to a thickness of not more than 1 mm to obtain a sample. The absorption spectrum of the sample at 77 K was measured. The CuCl and/or CuBr excitons absorption structures at from 350 to 450 nm were measured, and their absorbances were determined, and the positions of their peaks were measured.

The particle sizes (a (Å)) of the precipitated ultrafine particles were determined by the observation by a transmission type electron microscope.

The concentration of the precipitated ultrafine particles was obtained from the absorption coefficient of the excitons of single crystals of CuCl and/or CuBr $4.5 \times 10^5$ cm$^{-1}$ (half value width: 5 meV).

These measured values with respect to Sample Nos. 1 to 16 are shown in Table 1.

As is evident from the Table, from 0.01 to 10% by volume of the ultrafine particles of CuCl and/or CuBr having a particle size of from 10 to 500 Å precipitated efficiently, whereby very high non-linear optical effects can be expected.

COMPARATIVE EXAMPLES

Samples were prepared in the same manner as in Example 1 with respect to six types of glass having compositions other than the present invention, and ultrafine particles of CuCl and/or CuBr were precipitated. The measurements were conducted in the same manners. The compositions and the results of the measurements are shown by Sample Nos. 17 to 22.

The additives disclosed in Table 1 were added to the respective glass starting materials, and the amounts indicated represent the added amounts relative to 100 mol % of the glass.

TABLE 1

| Sample No. | Glass composition (mol %) | | | | | | | |
|---|---|---|---|---|---|---|---|---|
| | CuCl | CuBr | $SiO_2$ | $B_2O_3$ | $Al_2O_3$ | $Li_2O$ | $Na_2O$ | $K_2O$ |
| 1 | 1 | | 30 | 53 | 7 | | 9 | |
| 2 | | 1 | 15 | 70 | 10 | 4 | | |
| 3 | 1 | 1 | 60 | 32 | 1 | | 2 | 2 |
| 4 | 3 | | 15 | 32 | 30 | 10 | 5 | 5 |
| 5 | | 3 | 10 | 40 | 7 | 30 | 5 | 5 |
| 6 | 3 | | 39 | 31 | 2 | 16 | 9 | |
| 7 | 1 | | 45 | 40 | 4 | | | 10 |
| 8 | 9 | | 18 | 50 | 14 | 9 | | |
| 9 | | 5 | 28 | 33 | 16 | | 9 | 9 |
| 10 | 2 | | 24 | 33 | 2 | 35 | 3 | 1 |
| 11 | | 0.1 | 29.9 | 60 | 0.05 | | 10 | |
| 12 | 0.5 | | 34 | 40 | 25 | 0.5 | | |
| 13 | 1 | | 30 | 53 | 7 | | 9 | |
| 14 | | 1 | 15 | 70 | 10 | 4 | | |
| 15 | 9 | | 18 | 50 | 14 | 9 | | |
| 16 | | 5 | 28 | 33 | 16 | | 9 | 9 |
| 17 | 1 | | 64 | 19 | 6 | | 10 | |
| 18 | | 3 | 65 | 18 | 4 | | 10 | |
| 19 | 0.5 | 1.5 | 62 | 18 | 9 | 10 | | |
| 20 | 2 | | 47 | 26 | 17 | | | 8 |
| 21 | 4 | | 40 | 25 | 10 | 10 | 6 | 5 |
| 22 | 2 | | 47 | 26 | 17 | | | 8 |

| Sample No. | Additives (mol %) | | | | Precipitated ultrafine particles | |
|---|---|---|---|---|---|---|
| | SnO | $SnO_2$ | $Sb_2O_3$ | $Sb_2O_5$ | Particle size (Å) | Concentration (% by volume) |
| 1 | | | | | 40 | 0.5 |
| 2 | | | | | 45 | 0.6 |
| 3 | | | | | 25 | 0.1 |
| 4 | | | | | 80 | 1.2 |
| 5 | | | | | 100 | 1.4 |
| 6 | | | | | 50 | 0.9 |
| 7 | | | | | 40 | 0.4 |
| 8 | | | | | 120 | 3.9 |
| 9 | | | | | 70 | 2.2 |
| 10 | | | | | 20 | 0.1 |
| 11 | | | | | 20 | 0.03 |
| 12 | | | | | 22 | 0.1 |
| 13 | 1 | | | | 45 | 0.9 |
| 14 | | 0.5 | | | 50 | 1.1 |
| 15 | | 4 | | | 130 | 6.0 |
| 16 | | | 1 | | 80 | 3.9 |
| 17 | | | | | — | — |
| 18 | | | | | — | — |
| 19 | | | | | — | — |
| 20 | | | | | 15 | 0.004 |
| 21 | | | | | 10 | 0.005 |
| 22 | | | | 1 | 15 | 0.007 |

The glass having ultrafine particles of CuCl and/or CuBr precipitated therein according to the present invention, is expected to have very high non-linear optical effects. Further, by incorporating $Al_2O_3$ in a predetermined amount, it is possible to obtain glass having excellent weather resistance without reducing the non-linear optical effects. Furthermore, according to the present invention, ultrafine particles of CuCl and/or CuBr can be precipitated in a large amount at a low temperature, whereby glass having such non-linear optical effects can easily be produced.

What is claimed is:

1. Glass having ultrafine particles of CuCl and/or CuBr precipitated therein, which consists essentially of:
   from 10 to 70 mol % of $SiO_2$,
   from 30 to 90 mol % of $B_2O_3$,
   from 0.1 to 50 mol % of $Li_2O+Na_2O+K_2O$, and
   from 0.01 to 10 mol % of CuCl+CuBr.

2. Glass having ultrafine particles of CuCl and/or CuBr precipitated therein, which consists essentially of:
   from 10 to 70 mol % of $SiO_2$,
   from 30 to 90 mol % of $B_2O_3$,
   from 0.01 to 40 mol % of $Al_2O_3$,
   from 0.1 to 50 mol % of $Li_2O+Na_2O+K_2O$, and
   from 0.01 to 10 mol % of CuCl+CuBr.

* * * * *